United States Patent [19]

Boyle, Jr.

[11] Patent Number: 5,332,177
[45] Date of Patent: Jul. 26, 1994

[54] AIRCRAFT

[76] Inventor: James J. Boyle, Jr., 2957 Longleat Woods, Sarasota, Fla. 34235

[21] Appl. No.: 118,871

[22] Filed: Sep. 9, 1993

[51] Int. Cl.$^5$ .......................... B64C 3/10; B64C 3/38
[52] U.S. Cl. ............................ 244/34 A; 244/45 R; 244/46; 446/34; 446/57; 446/61
[58] Field of Search ............... 244/34 R, 35 R, 34 A, 244/45 R, 13, 15, 154, 153 R; 446/34, 56, 57, 61, 66; D12/319, 321; D21/87, 88, 89, 90

[56] References Cited

U.S. PATENT DOCUMENTS

| | | | |
|---|---|---|---|
| D. 292,203 | 10/1987 | Ligeti | D12/319 |
| D. 292,910 | 11/1987 | McGiboney | D12/331 |
| D. 311,370 | 10/1990 | Park | D12/319 |
| 2,276,642 | 3/1942 | Barker | 244/34 R |
| 2,929,580 | 3/1960 | Ciolkosz | 244/34 A |
| 3,017,139 | 1/1962 | Binder . | |
| 3,653,609 | 4/1972 | Bruning . | |
| 3,903,639 | 9/1975 | Howell . | |
| 4,053,125 | 10/1972 | Ratony | 244/46 |
| 4,248,007 | 2/1981 | Gamburd . | |
| 4,967,983 | 11/1990 | Motts . | |
| 5,102,068 | 4/1992 | Gratzer . | |

Primary Examiner—Galen L. Barefoot
Attorney, Agent, or Firm—Charles J. Prescott

[57] ABSTRACT

An aircraft capable of sustained flight including a fuselage and a spiral-formed flat-section right hand and left hand wing positioned in generally horizontally opposing relation along either side of the fuselage. Each wing is formed of an elongated flat panel or plate having generally parallel leading and trailing edges, the length of the panel being substantially greater than its width, the width being substantially greater than its thickness. The forward and rearward ends of each wing are movably connected within forward and rearward longitudinal channels of the fuselage. By appropriate controlled linear and rotational movement of the wing ends, in combination with a conventional rudder of an upright rear stabilizer fin of the fuselage, all aerodynamic flight path variable control is accomplished. Both single and multiple spiral-turned wings are provided.

32 Claims, 3 Drawing Sheets

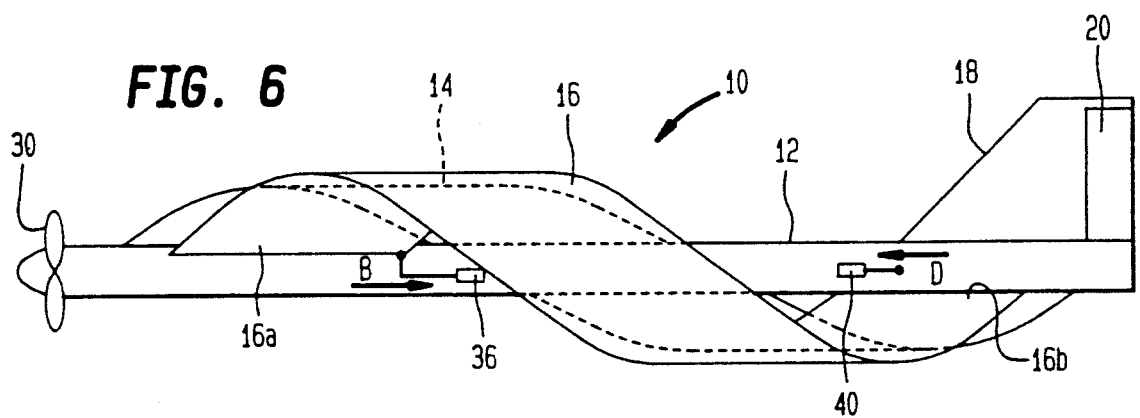
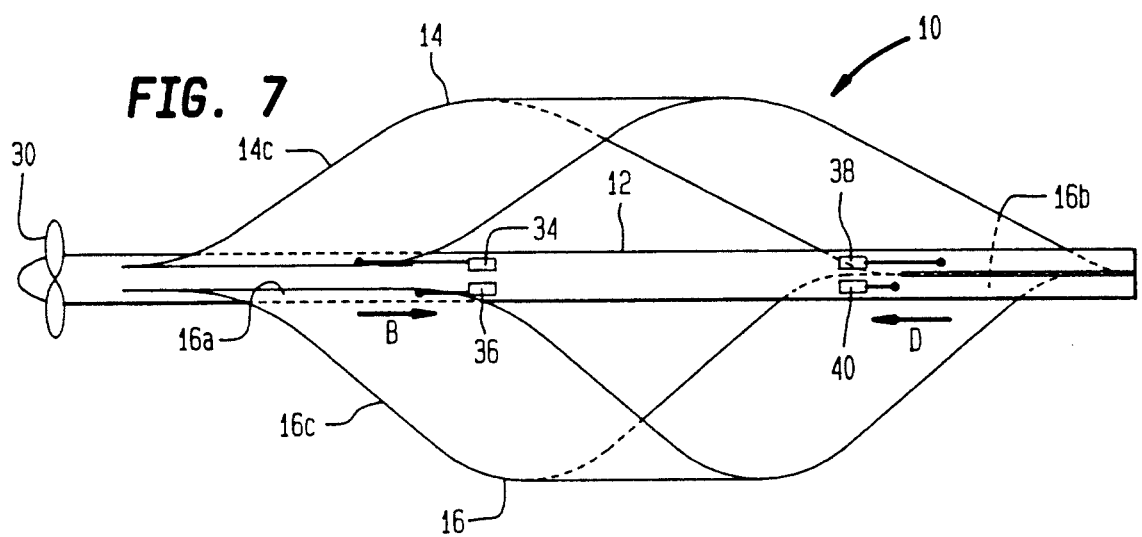
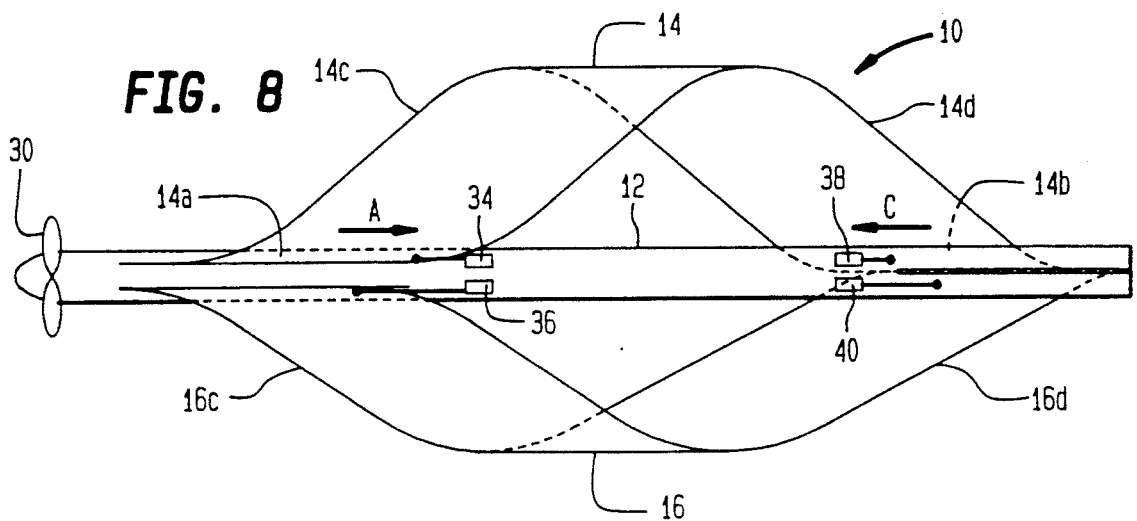

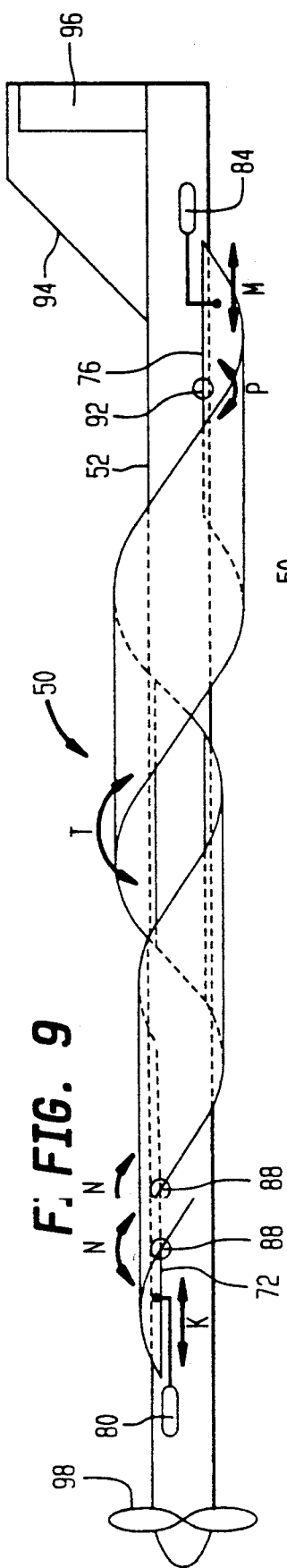
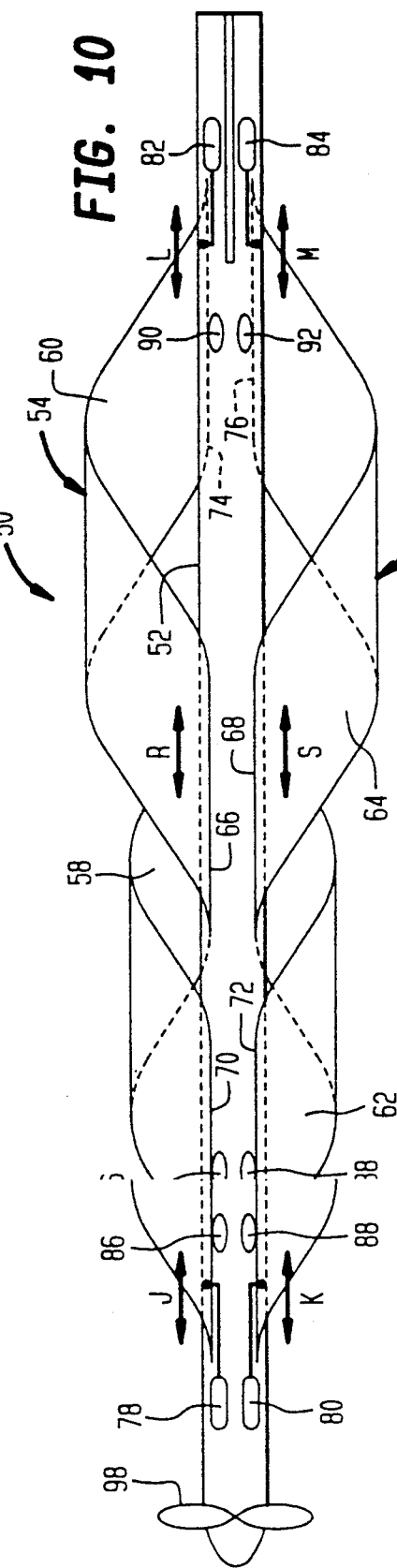
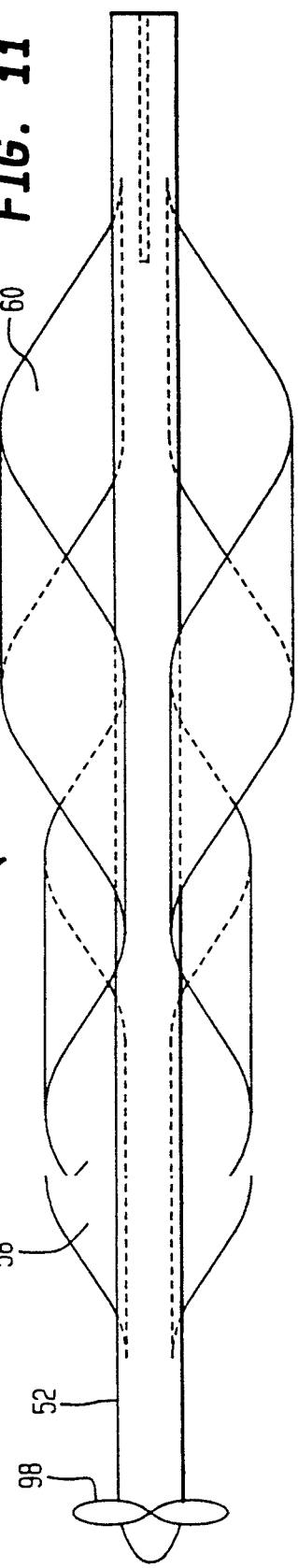

AIRCRAFT

BACKGROUND OF THE INVENTION

1. Scope of Invention

This invention relates generally to aircraft having a unique wing configuration, and more particularly to an aircraft for sustained flight which includes a pair of spiral wound wings which extend along either side of the fuselage.

2. Prior Art

In additional to conventional Bernoulli-effect type or planar-type wings for aircraft wherein lift is achieved by creating a lower pressure on the upper surface of the conventional wing, a number of uniquely configured lifting members for aircraft are disclosed in prior art.

A uniquely configured wing arrangement known as a "ring airfoil" is well known. The ring airfoil is constructed as a body substantially presenting rotational symmetry, i.e. being substantially cylindrical. One such devices is disclosed in U.S. Pat. No. 3,017,139 invented by Binder. Another ring or "annular" winged airplane is disclosed in a model form invented by Howell in U.S. Pat. No. 3,903,639. In this invention, two separate annular wings, one at each end of the fuselage, are disclosed.

Bruning, in U.S. Pat. No. 3,653,609 teaches a lifting body for an aircraft in the form of an inverted horizontally oriented semi-cylinder connected over a fuselage. A flying toy, including an annular or tubular aerodynamic member, is disclosed in U.S. Pat. No. 4,248,007 invented by Gamburd. A self-propelled lighter than air airship is disclosed in U.S. Pat. No. 4,967,983 to Motts having an annular or toroidal airfoil fuselage which houses elongated gas cells for lift.

A number of other uniquely configured, but less related wing structures for aircraft are disclosed in the following U.S. Patents:

| | |
|---|---|
| 4,306,856 | Walker |
| 5,102,068 | Gratzer |
| 3,135,202 | Herrmann |
| 4,886,224 | Joy |
| 4,560,358 | Adler |
| 4,790,788 | Hill |
| 3,135,484 | Herrmann |
| 4,456,265 | Adler |

The present invention provides an aircraft for self sustained flight which includes a pair of side-by-side spiral wound wings each of which are formed of an elongated semi-flexible flat panel or plate which provide both necessary flight-sustaining lift and maneuverability. Maneuverability is achieved by the unique linear and rotational movement of each end of each wing structure, in combination with a conventional rudder arrangement. By this invention, extreme simplicity, compactness for storing small aircraft in relatively small enclosures without disassembly and which will maneuverably fly at safe low levels, landing in relatively short runways.

BRIEF SUMMARY OF THE INVENTION

This invention is directed to an aircraft capable of sustained flight including a fuselage and a spiral-formed flat-section right hand and left hand wing positioned in generally horizontally opposing relation along either side of the fuselage. Each wing is formed of an elongated semi-flexible flat panel or plate having generally parallel leading and trailing edges, the length of the panel being substantially greater than its width, the width being substantially greater than its thickness. The forward and rearward ends of each wing are movably connected within forward and rearward longitudinal channels of the fuselage. By appropriate controlled linear and rotational movement of the wing ends which resiliently deforms or reshapes the wing(s) correspondingly, in combination with a conventional rudder of an upright rear stabilizer fin of the fuselage, full aerodynamic flight path variable control is accomplished. Both single and multiple spiral-turned wings are provided.

It is therefore an object of this invention to provide an aircraft which includes a uniquely configured spiral formed wing arrangement positioned and extending laterally along each side of a fuselage.

It is another object of this invention to provide a unique aircraft which is extremely compact for transport and storage in relatively small enclosures without disassembly.

It is another object of this invention to provide a unique aircraft which does not rely upon a Bernoulli principal for achieving sustained flight.

It is another object of this invention to provide an aircraft which includes a spiral wound wing formed of conventional flat semi-flexible panel material of a sufficient strength to sustain airlift during flight and yet be sufficiently flexible to be resiliently deformed to accomplish maneuvering, takeoff and landing.

It is another object of this invention to provide an aircraft having a pair of spiral wound wings which afford full maneuverability during flight, safe low level flight and relatively short runway requirements for landing and takeoff.

It is another object of this invention to provide a unique aircraft for sustained flight which is adaptable to both single and multiple spiral wound wings for a broad range of load carrying capacity.

In accordance with these and other objects which will become apparent hereinafter, the instant invention will now be described with reference to the accompanying drawings.

BRIEF DESCRIPTION OF THE DRAWINGS

FIG. 6 is a side elevation view similar to FIG. 3 depicting relative wing movement to accomplish maneuvering of the aircraft.

FIG. 7 is a top plan view of FIG. 6.

FIG. 8 is a view similar to FIG. 7 depicting an opposite relative movement of the wings with respect to the fuselage.

FIG. 9 is a side elevation view of a double spiral wound wing embodiment of the invention.

FIG. 10 is a top plan view of FIG. 9.

FIG. 11 is a bottom plan view of FIG. 9.

DETAILED DESCRIPTION OF THE INVENTION

Figure 1:
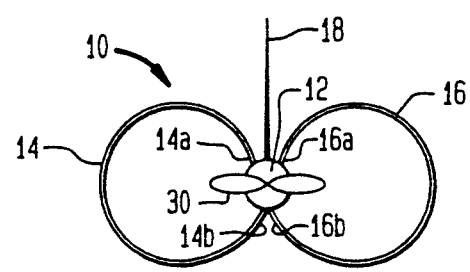
FIG. 1 is a front elevation view of one embodiment of the invention.

Referring now to the drawings, and particularly to FIGS. 1 to 5, one embodiment of the invention is shown generally at numeral 10 which is directed to a pair of spiral wound wings 14 and 16 connected and extending along either side of an elongated fuselage 12. Each of the wings 14 and 16 is formed of a length of a flat elongated semi-rigid, resiliently deformable panel or plate material having a flat length-to-width ratio of about 7:1 and a width-to-thickness radio of about 100:1. As seen in FIG. 1, the right wing 14 is spiral wound in a counterclockwise (CCVV) direction as viewed from the front of the aircraft, while the left wing 16 is wound in a clockwise (CVV) direction. Each wing 14 and 16 is thus wound around an imaginary cylinder positioned in horizontally opposing fashion and extending along either side of the fuselage 12. The preferred ratio of overall spiral-configured wing length to the diameter of each imaginary cylinder which defines the diameter of each wing 14 and 16 is in the range of approximately 5:1, but may be in a broader range of about 3:1 to 7:1.

The aircraft 10 also includes a propulsion means 30 which may be in the form of either a conventional propeller driven engine arrangement, a ducted fan type propulsion means or the like. An upright vertical fin 18 supporting a controllably pivotable rudder 20, in combination with movement to the wings 14 and 16 as will be described herebelow, provide both additional turning maneuverability and the ability to slip the aircraft in either direction on landing.

Figure 2:
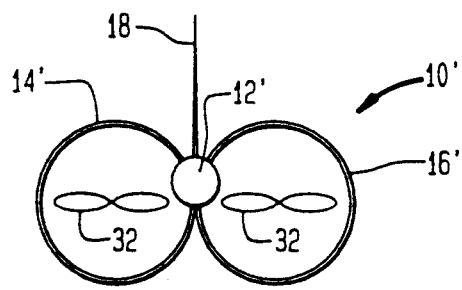
FIG. 2 is a front elevation view of another embodiment of the invention.

As seen in comparing FIGS. 1 and 2, the spiral wing arrangement may include spiral wings 14 and 16 which are positioned vertically generally even with the longitudinal axis of the fuselage in FIG. 1 or may be displaced either upwardly or downwardly with respect to the fuselage 12' without affecting performance as contemplated by this invention. Additionally, in FIG. 2, propulsion means 32 may be positioned within the cylindrical projection of each of the wings 14' and 16'.

The forward ends 14a and 16a are connected within channels 22 and 24 of fuselage 12 so as to be independently movable longitudinally with respect to fuselage 12 in the direction of arrows A and B, respectively. Linear actuators 34 and 36, operably connected to these forward wing ends 14a and 16a, respectively, provide this controlled movement.

Figure 3:
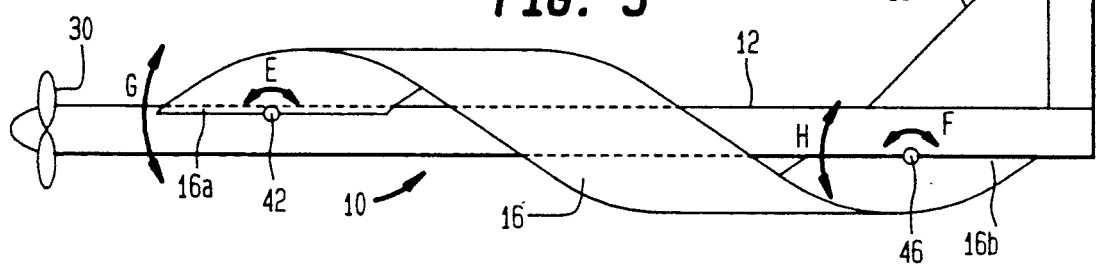
FIG. 3 is a side elevation view of the invention shown in FIG. 1.
Figure 4:
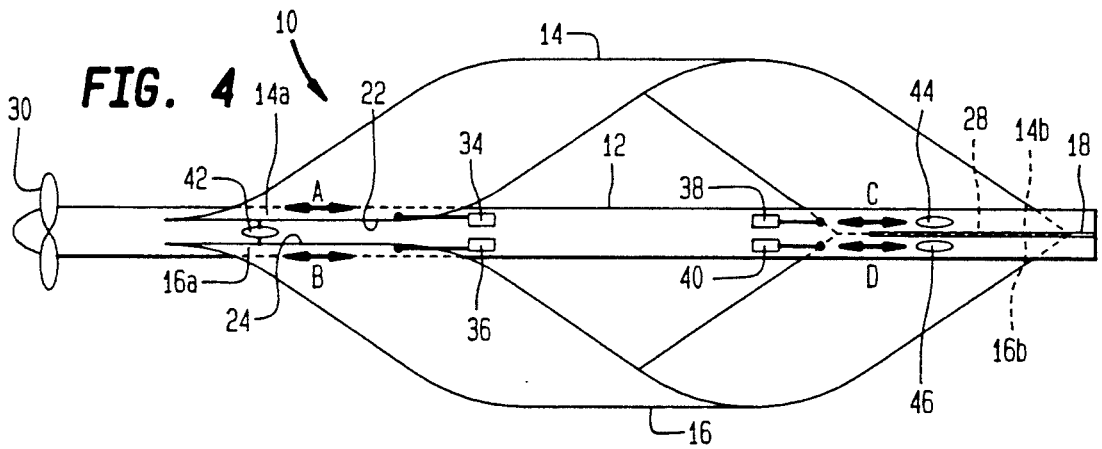
FIG. 4 is a top plan view of FIG. 3.
Figure 5:
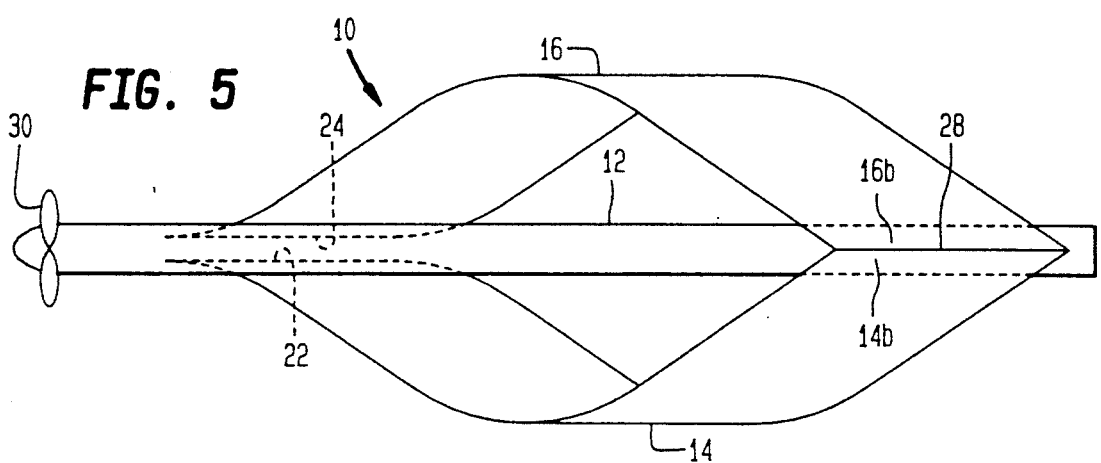
FIG. 5 is a bottom plan view of FIG. 3.

As seen in FIGS. 3 and 4, the forward ends 14a and 16a are also rotatable about an axis horizontal and transverse to the fuselage 12 in the direction of arrow G. An actuator 42 accomplishes this independent rotational input for each wing 14 and 16 by output rotation in the direction of arrow E.

Although it is preferred that the rearward ends 14b and 16b of wings 14 and 16, respectively, be rigidly secured into a longitudinally oriented channel 28 in the rearwardly section of the fuselage 12, optional maneuverability is also accomplished by linear actuators 38 and 40 independently moving the rearward ends 14b and 16b in the direction of arrows C and D, while rotational actuators 44 and 46 also independently rotate the rearward ends 14b and 16b in the direction of arrow H by rotation of the actuators 44 and 46 in the direction of arrow F.

Referring additionally to FIGS. 6, 7 and 8, relative linear movement of each end of one spiral wing is there shown. In FIGS. 6 and 7, the forward end 16a of wing 16 is moved rearwardly in the direction of arrow B by linear actuator 36 while the rearward end 16b is moved forwardly in the direction of arrow D by linear actuator 40. The relative spiral shape of each wing 14 and 16 with respect to one another is thus generally depicted and shows that the leading edge 16c also moves rearwardly with respect to leading edge 14c. Additionally, the diameter of wing 16 is increased with respect to wing 14. In FIG. 8, the forward end 14a of wing 14 is moved rearwardly in the direction of arrow A by linear actuator 34, while the rearward end 14b is moved forwardly in the direction of arrow C by linear actuator 38. Here again, the relative spiral shape of wing 14 with respect to wing 16 is depicted, showing the leading edge 14c being positioned rearwardly with respect to leading edge 16c, while the trailing edge 14d is positioned forwardly with respect to leading edge 16d as a result of the resilient deformation of the neutral configuration of wing 14.

It is due to this resilient deformation of each wing 14 and 16, when moved either linearly or rotational as above described, which requires that these wings 14 and 16 be of a semi-flexible, resilient nature. Once properly positioned, the wings 14 and 16 must generally maintain their shape integrity so as to sustain flight and their shape during each particular selected maneuver. However, being resiliently semi-flexible allows the various actuators to quickly reposition and reconfigure each wing 14 and 16 to accomplish the desired aircraft maneuver.

OPERATION OF AIRCRAFT

The aircraft 10 is thus maneuvered by controlled linear or rotational actuation of one or both ends of one or both spiral wings 14 and 16 as previously described. The following maneuvers and the corresponding wing configurations are listed in Table I herebelow.

TABLE 1

| Manuever | Wing Position |
|---|---|
| Climb | Activators 44 and 46 are evenly rotated CCW in the direction of arrow F rotating the rearward ends 14b and 16b CCW in the direction of arrow H in FIG. 3. |
| Right Turn | See FIGS. 6 and 7. |
| Left Turn | See FIG. 8. |
| Right Slip | Same as right turn with rudder deflected to left. |
| Descent | Power off. Both wing forward ends 14a and 14b evenly moved forward in the direction of arrows A and B by actuators 34 and 36. |
| Nose Down | Actuators 44 and 46 are evenly rotated CW in the direction of arrow F rotating the rearward ends 14b and 16b CW in the direction of arrow H in FIG. 3. |
| Cruise | Actuator 42 is rotated CCW in the direction of arrow E rotating the forward ends 14a and 16a CCW in the direction of arrow G in FIG. 3. |
| Slow Flight | Actuator 42 is rotated CW in the direction of arrow E rotating the forward ends 14a and 16a CW in the directon of arrow G in FIG. 3. |
| Vertical Descent | Slow flight plus climb. |

Referring now to FIGS. 9, 10 and 11, a double-winged aircraft is shown generally at numeral 50 and includes a double wound pair of spiral wings 54 and 56. The forwardly wing portions 58 and 62 of wings 54 and 56, respectively, are wound about smaller imaginary cylinders positioned lengthwise straddling fuselage 52, while the rearwardly wing portions 60 and 64 of the wings 54 and 56, respectively, are spiral wound around a correspondingly larger imaginary cylinders coaxial with the corresponding smaller imaginary cylinder similarly positioned.

The forwardly wing ends 70 and 72 movably connected to the forwardly portion of fuselage 52 within longitudinal channels (not shown) for both linear movement in the direction of the arrows J and K by linear actuators 78 and 80 and for rotational movement in the direction of arrow N by rotational actuators 86 and 88. The rearwardly wing ends 74 and 76 are also movably connected within longitudinal channels (not shown) in a rearwardly portion of fuselage 52 for linear movement in the direction of arrows L and M by linear actuators 82 and 84 and for rotational controlled movement in the direction of arrow P by rotational actuators 90 and 92.

As previously described, wing 54 is spiral wound in a counterclockwise (CCW) direction when viewed from the front of the aircraft 50, while wing 56 is spiral wound in a clockwise (CW) direction with respect thereto. A vertical stabilizer fin 94 having a pivotal rudder 96 may also be provided to enhance maneuverability and to facilitate conventional side slips during landing but in this embodiment 50, are not required or preferred.

The advantages of this embodiment 50 of the invention are to provide a very stable aircraft having a wider availability of both linear and rotational movement of the attaching points between the wings 54 and 56 and the fuselage 52. Carrying capacity is also increased. In this embodiment 50, the forwardly portions 58 and 62 of the wing 54 and 56 are smaller than the rearwardly portions 60 and 64 as previously described. However, these wing portions may be of a similar diameter or reversed to accomplish variations in load balance and flight characteristics.

In lieu of, or in addition to, linear and rotational movement of the forward ends 70 and 72 and rearward ends 74 and 76 of wings 54 and 56, respectively, the central portion at 66 and 68 may also be made both rotationally movable in the direction of arrow T and linearly moveable in the direction of arrows R and S. With such mid wing control, pitch of the airplane 50 is controlled by moving the mid wing points 66 and 68 forwardly and rearwardly in the directions of arrows R and S, while turns and banks are controlled by CW and CCW rotation in the direction of arrows T.

In this embodiment 50 the installed overall length-to-width radio of the aircraft 50 is in the range of 4:1, allowing a proportionately narrower width to achieve approximately the same wing area for sustaining flight as aircraft 10 which has a preferred length-to-width ratio of about 5:1.

In addition to providing for variations between the spiral diameters between forward and rearward wing portions of this embodiment 50, the wing width or cord may also be varied to achieve further variable lift characteristics between these two wing portions.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An aircraft comprising:
   an elongated fuselage having a length along the direction of travel;
   a wing positioned along each of two opposing sides of said fuselage and being in a form of an elongated flat panel having a width substantially greater than a thickness thereof and having a length substantially greater than the width thereof;
   each said wing being spiral wound about an imaginary cylinder having a longitudinal axis positioned along the length of each side of said fuselage, each said wing being generally circular when viewed in the direction of travel;
   a forward end of each said wing connected in side-by-side arrangement to a forward lengthwise area of said fuselage;
   a rearward end of each said wing connected in side-by-side arrangement to a rearwardly lengthwise area of said fuselage.

2. An aircraft as set forth in claim 1, wherein:
   each said forward end is independently movable fore and aft with respect to said fuselage.

3. An aircraft as set forth in claim 2, wherein:
   each said forward end is independently rotatable with respect to said fuselage about a horizontal axis transverse to said fuselage.

4. An aircraft as set forth in claim 3, wherein: each said rearward end is independently movable fore and aft with respect to said fuselage.

5. An aircraft as set forth in claim 4, wherein:
   each said rearward end is independently rotatable with respect to said fuselage about a horizontal axis transverse to said fuselage.

6. An aircraft as set forth in claim 1, further comprising:
   a moveable rudder operably connected for controlled pivotal movement about an upright axis of a vertical stabilizer connected to a rearward portion of said fuselage.

7. An aircraft as set forth in claim 1, further comprising:
   propulsion means for moving said aircraft forwardly through air.

8. An aircraft as set forth in claim 1, wherein:
   each said wing is spiral wound through approximately two full turns, a mid point of each said wing being connected in side-by-side arrangement to a mid lengthwise area of said fuselage.

9. An aircraft as set forth in claim 8, wherein:
   each said mid point is movable fore and aft and is rotatable about a horizontal transverse axis through a mid region of said fuselage.

10. An aircraft as set forth in claim 1, wherein:
    a length of each said wing being in the range of three (3) to seven (7) times that of a diameter of said imaginary cylinder.

11. An aircraft as set forth in claim 1, wherein:
    each said length of each said wing being in the range of about seven (7) times that of said width thereof.

12. An aircraft comprising:
    a fuselage;
    a wing connected to and extending generally horizontally in opposing directions from each side of said fuselage;
    each said wing formed of a flat elongated flexible panel having generally parallel longitudinal side edges and formed into a one-turn spiral configuration through approximately 360 degrees from a forward end thereof to a rearward end thereof, each said side edge being generally circular when viewed in a direction of flight;
    a forward end of each said wing movably connected to a forwardly positioned longitudinal channel formed into said fuselage;

a rearward end of each said wing movably connected to a rearwardly positioned longitudinal channel formed into said fuselage.

13. An aircraft as set forth in claim 12, wherein: each said forward end is independently movable fore and aft with respect to said fuselage.

14. An aircraft as set forth in claim 13, wherein: each said forward end is independently rotatable with respect to said fuselage about an axis transverse to said fuselage.

15. An aircraft as set forth in claim 14, wherein: each said rearward end is independently movable fore and aft with respect to said fuselage.

16. An aircraft as set forth in claim 15, wherein: each said rearward end is independently rotatable with respect to said fuselage about an axis transverse to said fuselage.

17. An aircraft as set forth in claim 12, further comprising:
a moveable rudder operably connected for controlled pivotal movement about an upright axis of a vertical stabilizer connected to a rearward portion of said fuselage.

18. An aircraft as set forth in claim 12, further comprising: propulsion means for moving said aircraft forwardly through air.

19. An aircraft as set forth in claim 12, wherein: each said wing is spiral wound through approximately two full turns, a mid point of each said wing being connected in side-by-side arrangement to a mid lengthwise area of said fuselage.

20. An aircraft as set forth in claim 19, wherein: each said mid point is movable fore and aft and is rotatable about a horizontal transverse axis through a mid region of said fuselage.

21. An aircraft as set forth in claim 12, wherein: a length of each of said wing being in the range of three (3) to seven (7) a diameter of said imaginary cylinder.

22. An aircraft as set forth in claim 12, wherein: a length of each said wing being in the range of about seven (7) times that of a width thereof.

23. An aircraft capable of sustained flight comprising:
an elongated fuselage;
a right hand and a left hand spiral shaped wing each being formed from a flat elongated flexible panel having generally parallel spiral leading and trailing edges;
means for movably connecting a forward and a rearward end of each said wing longitudinally to a forwardly and rearwardly section, respectively, of said fuselage;
said leading and trailing edges of said right hand and left hand wings being spiraled in a counterclockwise and a clockwise direction, respectively, along a length of said fuselage when viewed from a front end of said fuselage;
propulsion means for moving said aircraft forwardly through air.

24. An aircraft as set forth in claim 23, wherein: each said forward end is independently movable fore and aft with respect to said fuselage.

25. An aircraft as set forth in claim 24, wherein: each said forward end is independently rotatable with respect to said fuselage about an axis transverse to said fuselage.

26. An aircraft as set forth in claim 25, wherein: each said rearward end is independently movable fore and aft with respect to said fuselage.

27. An aircraft as set forth in claim 26, wherein: each said rearward end is independently rotatable with respect to said fuselage about an axis transverse to said fuselage.

28. An aircraft as set forth in claim 23, further comprising:
a moveable rudder operably connected for controlled pivotal movement about an upright axis of a vertical stabilizer connected to a rearward portion of said fuselage.

29. An aircraft as set forth in claim 23, wherein: each said wing is spiral wound through approximately two full turns, a mid point of each said wing being connected in side-by-side arrangement to a mid lengthwise area of said fuselage.

30. An aircraft as set forth in claim 23, wherein: a length of each of said wing being in the range of three (3) to seven (7) a diameter of said imaginary cylinder.

31. An aircraft as set forth in claim 29, wherein: each said mid point is movable fore and aft and is rotatable about a horizontal transverse axis through a mid region of said fuselage.

32. An aircraft as set forth in claim 23, wherein: a length of each said wing being in the range of about seven (7) times that of a width thereof.

* * * * *